(12) United States Patent
Ludvigsen et al.

(10) Patent No.: US 11,255,164 B2
(45) Date of Patent: Feb. 22, 2022

(54) GRAPHICAL REPRESENTATION MANAGEMENT

(71) Applicant: Schlumberger Technology Corporation, Sugar Land, TX (US)

(72) Inventors: Hallgrim Ludvigsen, Stavanger (NO); Mark Gerrard Douglas, London (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 331 days.

(21) Appl. No.: 16/325,712

(22) PCT Filed: Aug. 17, 2016

(86) PCT No.: PCT/US2016/047231
§ 371 (c)(1),
(2) Date: Feb. 14, 2019

(87) PCT Pub. No.: WO2018/034656
PCT Pub. Date: Feb. 22, 2018

(65) Prior Publication Data
US 2020/0399990 A1 Dec. 24, 2020

(51) Int. Cl.
*G06F 3/0482* (2013.01)
*E21B 43/00* (2006.01)
(Continued)

(52) U.S. Cl.
CPC .......... *E21B 43/00* (2013.01); *G06F 3/04812* (2013.01); *G06T 11/60* (2013.01)

(58) Field of Classification Search
CPC ............... G06F 16/583; G06F 16/2365; G06F 16/90344
See application file for complete search history.

(56) References Cited

U.S. PATENT DOCUMENTS 7,818,687 B2 10/2010 Brouaux
2005/0270307 A1* 12/2005 Jacques Brouaux . G06F 3/0481
345/619
(Continued)

FOREIGN PATENT DOCUMENTS

EP 3002691 4/2016
WO 2015/171799 A1 11/2015

OTHER PUBLICATIONS

International Search Report and Written Opinion for the equivalent International patent application PCT/US2016/047231 dated May 16, 2017.
(Continued)

*Primary Examiner* — Rayeez R Chowdhury

(57) ABSTRACT

Dynamically combining graphical information from multiple windows displayed in a graphical user interface includes displaying a first window including a first graphic representation of a first data set, and a second window including a second graphic representation of a second data set. An overlap condition is detected by constantly monitoring a boundary of the first window and a boundary of the second window. In response to detecting the overlap condition, the first data set and the second data set are processed to identify a first and second set of attributes of the first and second data sets, respectively. A third set of attributes is determined, whereby the third set of attributes is common to the first set of attributes and the second set of attributes. A third window including a third graphic representation is generated and displayed based on the first graphic representation and the third set of attributes.

20 Claims, 11 Drawing Sheets

(51) Int. Cl.
   *G06F 3/04812*   (2022.01)
   *G06T 11/60*     (2006.01)

(56)             References Cited

U.S. PATENT DOCUMENTS

2008/0126992 A1*   5/2008   Scheu .................. G06F 3/0482
                                                        715/835
2009/0299709 A1   12/2009   Liu
2012/0171165 A1    7/2012   Buck et al.
2014/0379317 A1*  12/2014   Sanden ................ G01V 99/005
                                                        703/10
2015/0227299 A1    8/2015   Pourshahid

OTHER PUBLICATIONS

International Preliminary Report on Patentability for the equivalent International patent application PCT/US2016/047231 dated Feb. 28, 2019.
Extended European search report for the equivalent European Patent Application No. 16913605.8 dated May 29, 2020, 12 pages.

* cited by examiner

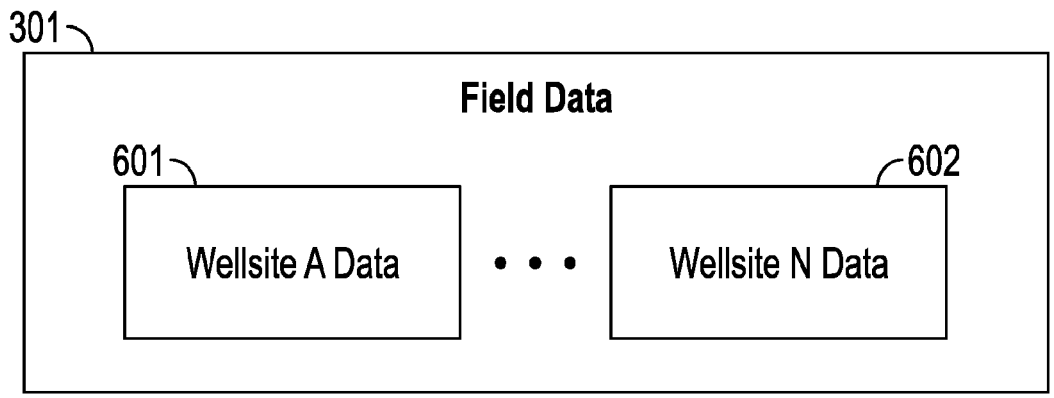
FIG. 6.1
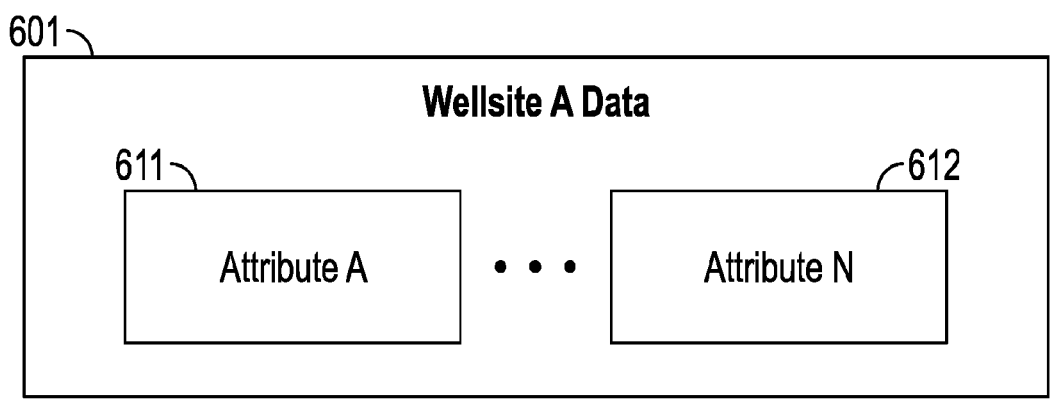
FIG. 6.2
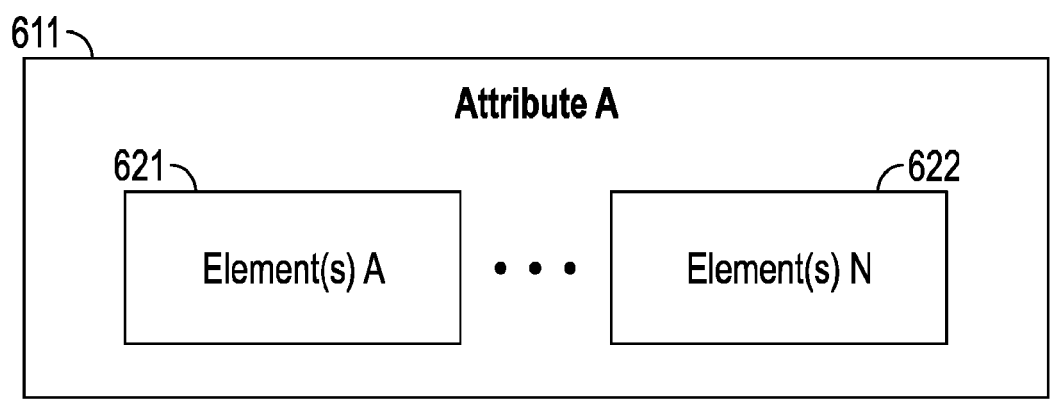
FIG. 6.3

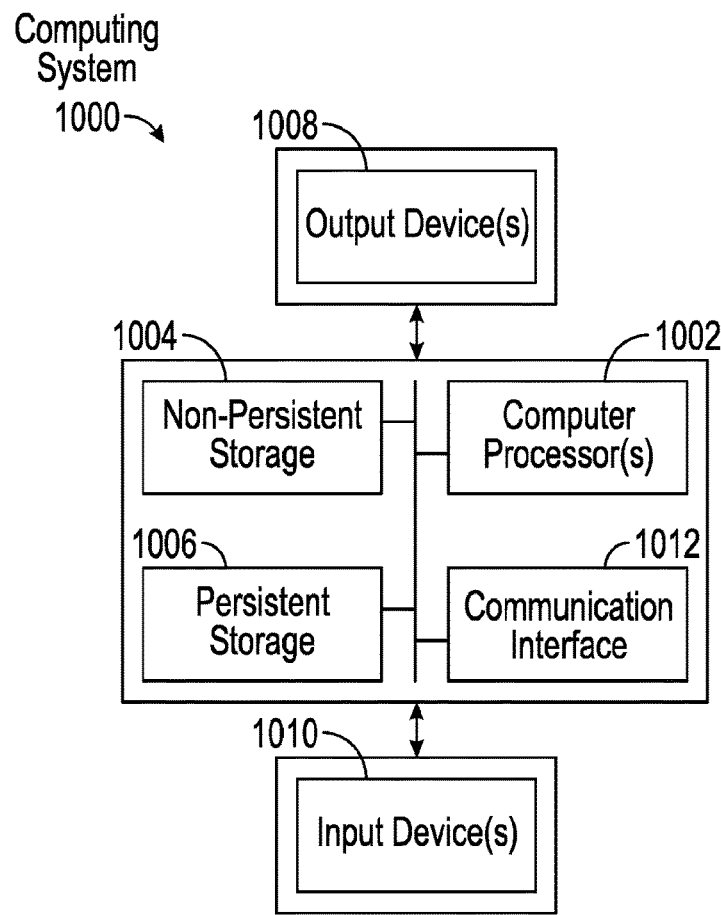
FIG. 10.1
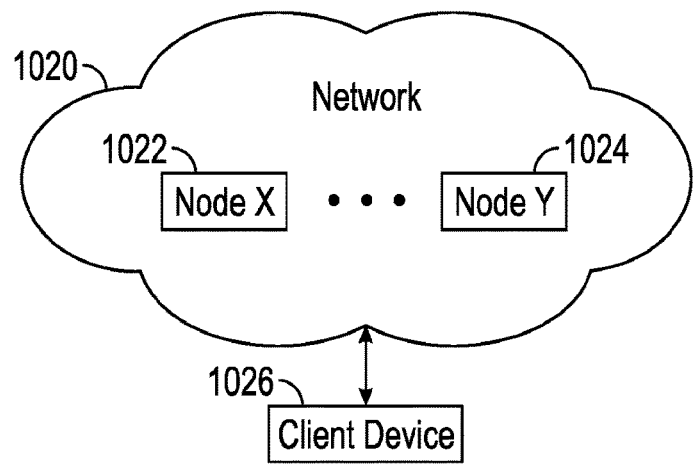
FIG. 10.2

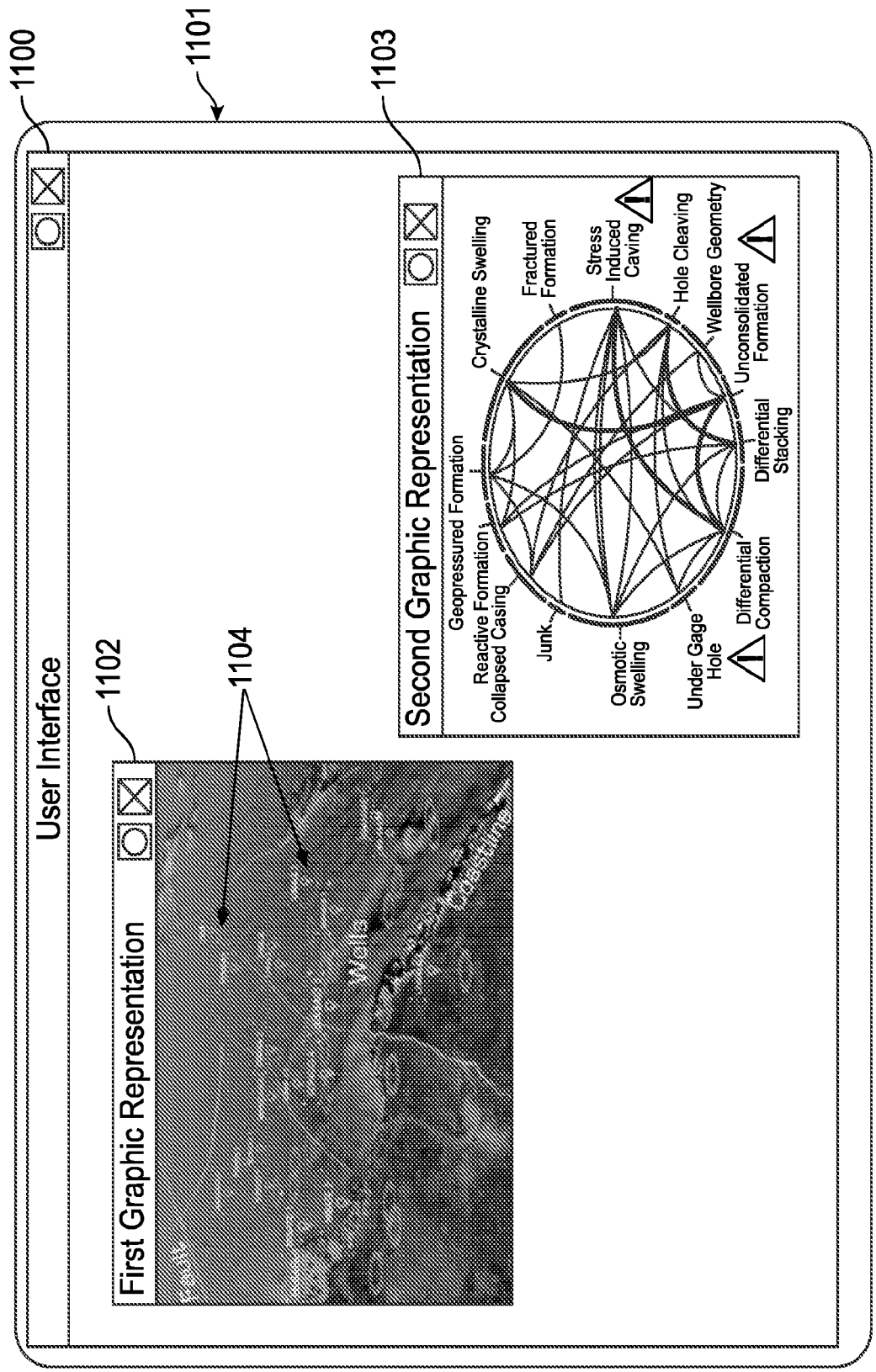
FIG. 11.1

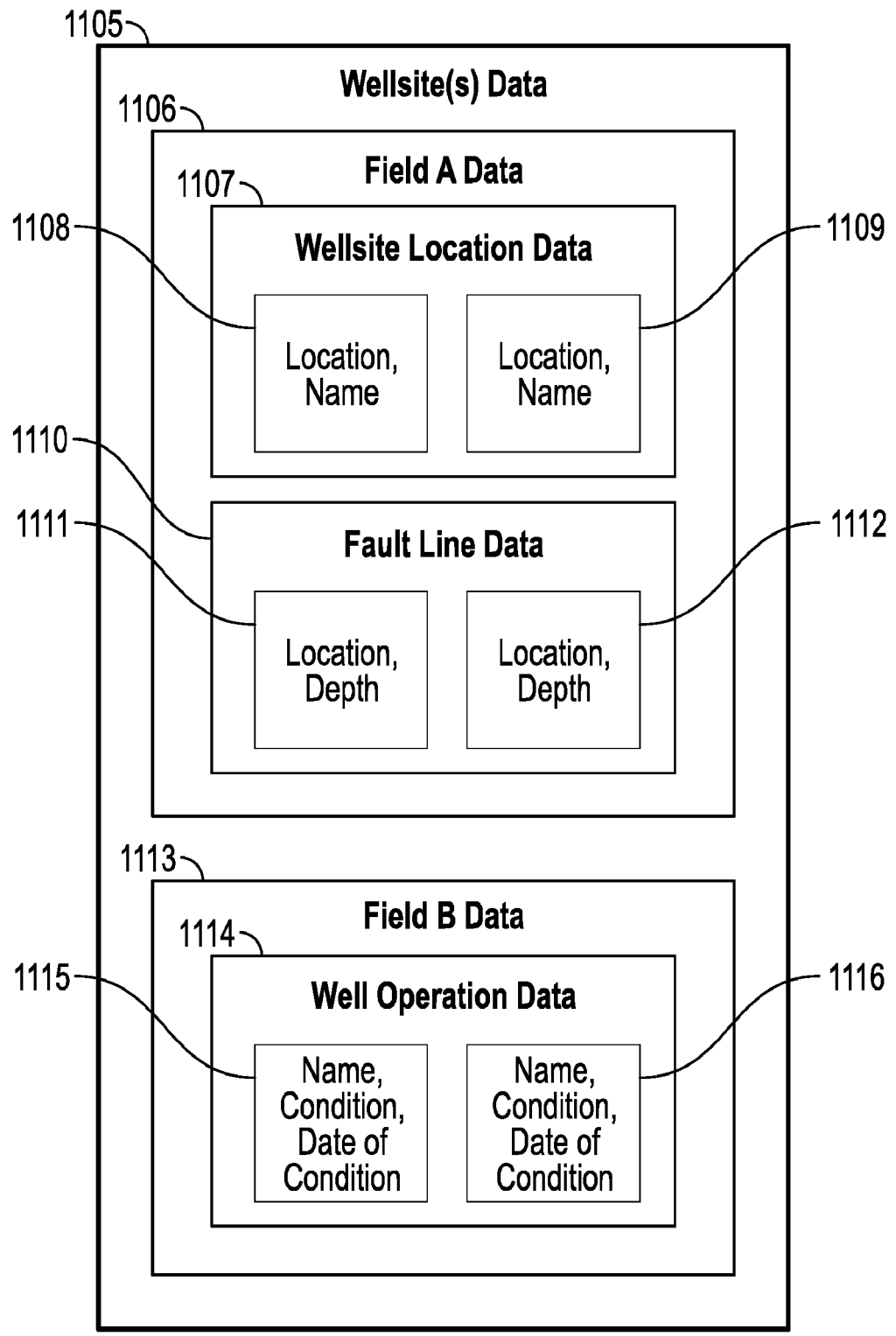
FIG. 11.2

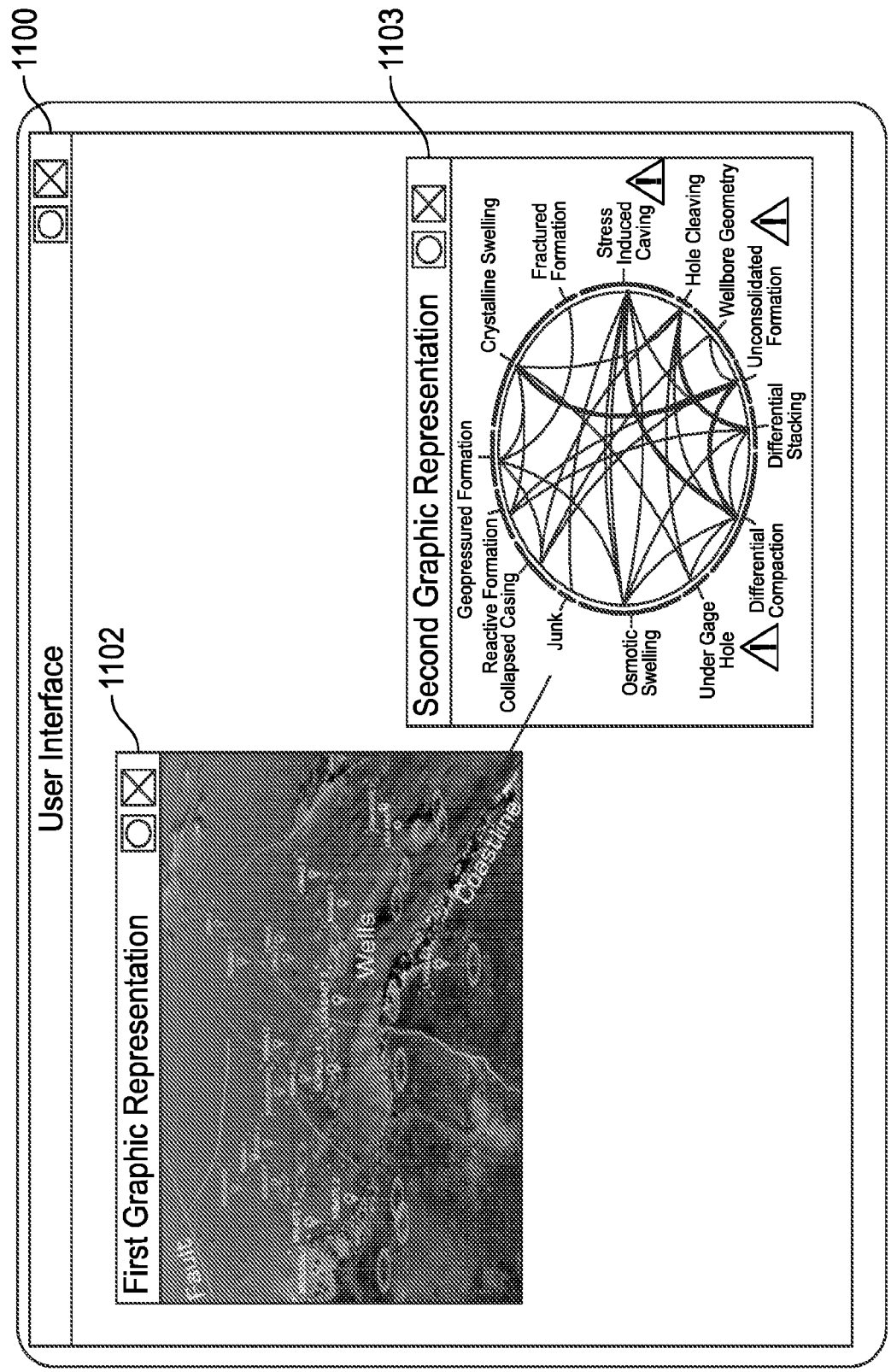
FIG. 11.3

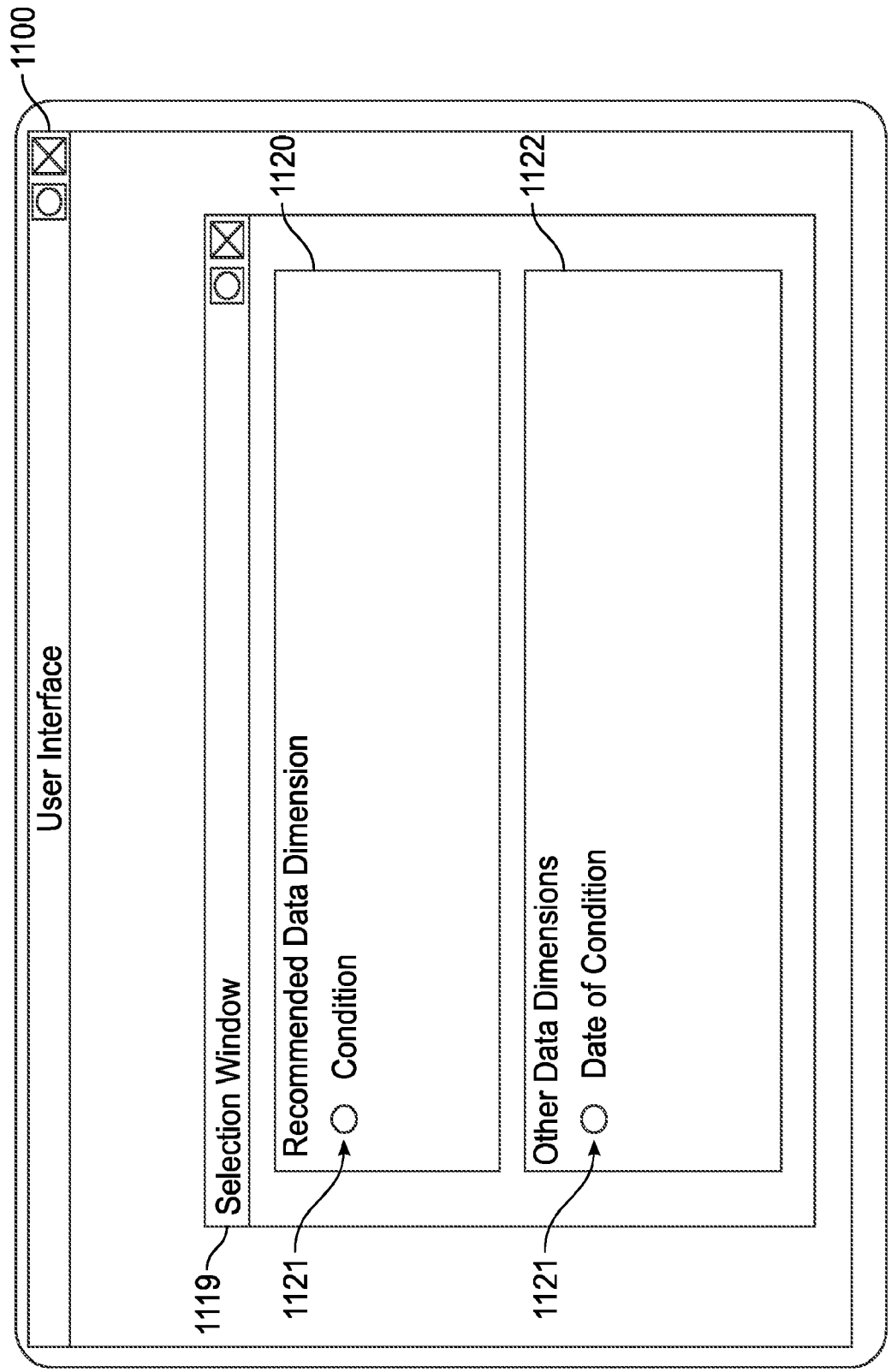
FIG. 11.4

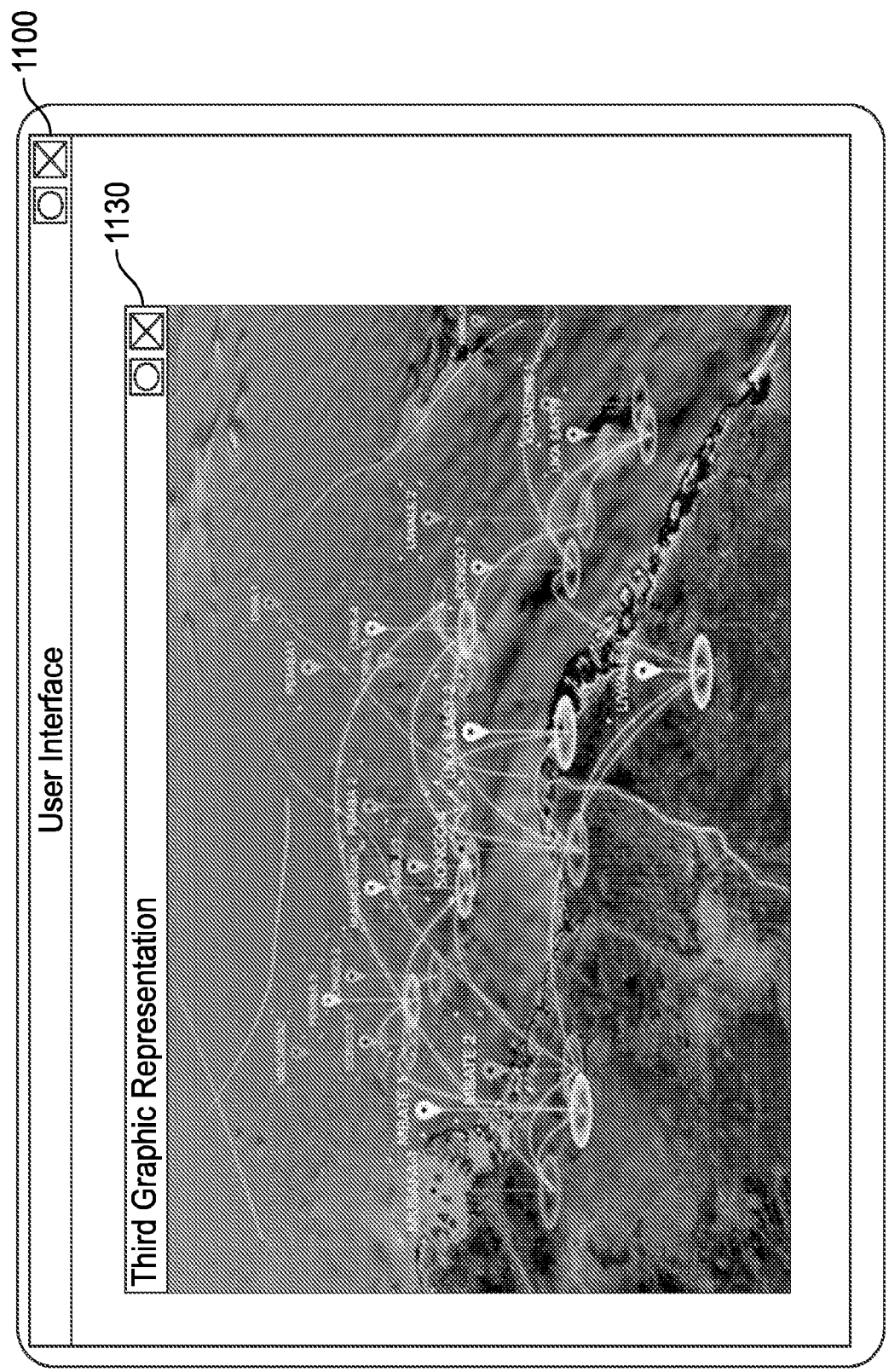
FIG. 11.5

GRAPHICAL REPRESENTATION MANAGEMENT

BACKGROUND

Hydrocarbon fluids, such as oil and natural gas, are obtained from a subterranean geologic formation, referred to as a reservoir, by drilling a well that penetrates the hydrocarbon-bearing formation. Different wells may have different structures including the length, radius, and direction of the wellbores that make up the structure of the well and completion components located within each of the wellbores.

SUMMARY

In general, in one aspect, embodiments relate to dynamically combining graphical information from multiple windows displayed in a graphical user interface. A first window including a first graphic representation of a first data set, and a second window including a second graphic representation of a second data set are displayed. An overlap condition is detected by constantly monitoring a boundary of the first window and a boundary of the second window. In response to detecting the overlap condition, the first data set and the second data set are processed to identify a first and second set of attributes of the first and second data sets, respectively. A third set of attributes is determined, whereby the third set of attributes is common to the first set of attributes and the second set of attributes. A third window including a third graphic representation is generated and displayed based on the first graphic representation and the third set of attributes.

BRIEF DESCRIPTION OF DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein.

FIG. 6.1 shows a schematic diagram of a system in accordance with one or more embodiments.

FIG. 6.2 shows a schematic diagram of a system in accordance with one or more embodiments.

FIG. 6.3 shows a schematic diagram of a system in accordance with one or more embodiments.

FIG. 10.1 shows a schematic diagram of a system in accordance with one or more embodiments.

FIG. 10.2 shows a schematic diagram of a network system in accordance with one or more embodiments.

FIG. 11.1 shows an example of a user interface in accordance with one or more embodiments.

FIG. 11.2 shows an example of data on which the user interface shown in FIG. 11.1 is based.

FIG. 11.3 shows an overlap of the example of the user interface shown in FIG. 11.1.

FIG. 11.4 shows a selection window of the user interface shown in FIG. 11.1.

FIG. 11.5 shows a third graphic representation of the user interface shown in FIG. 11.1.

DETAILED DESCRIPTION

Figure 1:
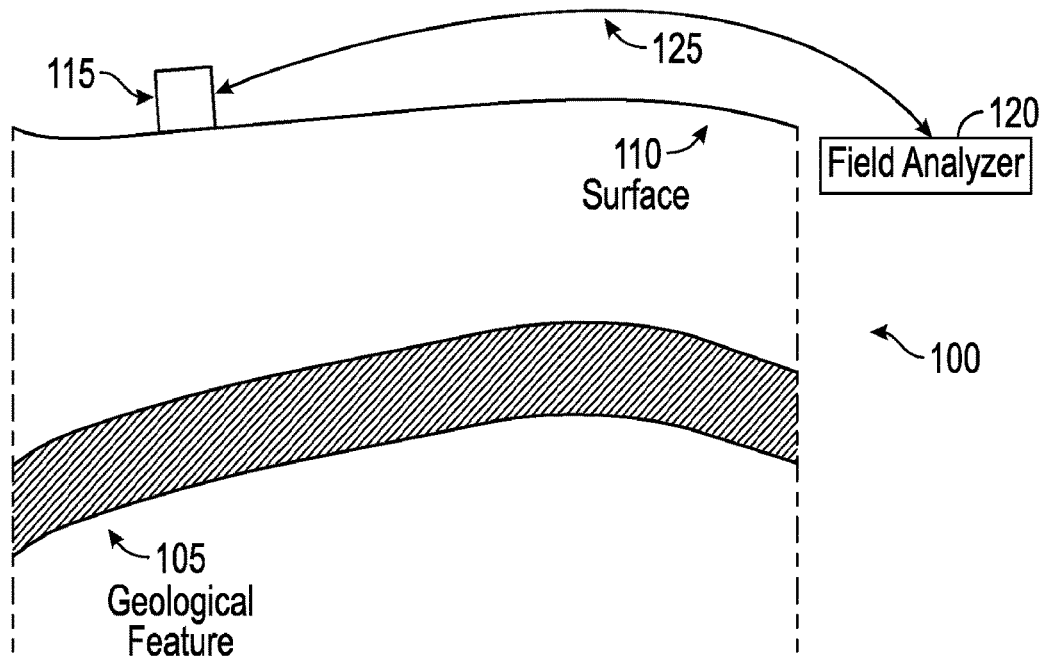
FIG. 1 shows a schematic diagram of a wellsite in accordance with one or more embodiments.

Specific embodiments of the technology will now be described in detail with reference to the accompanying figures. Like elements in the various figures are denoted by like reference numerals.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to methods for dynamically combining graphical information from multiple graphical representations of data displayed in multiple windows on a graphic user interface. The combined graphical information may include representations of data, where the data was not graphically represented in any of the multiple graphical representations but was present in data sets on which the graphical representations are based. As used herein, auxiliary data refers to data that is not graphically represented in any of a number graphical representations of data sets being displayed but is present in the data sets on which the graphical representations are based.

The representations of the auxiliary data may be based on data relationships that are graphically present in separate graphical representations of the multiple graphical representations. In some embodiments, the representations of the auxiliary data may be based on a data relationship that is graphically present in one of the graphical representations and a data relationship that is not graphically present in any of the multiple graphical representations. For example, some graphical representations may be based on a portion of a multidimensional data set and, thereby, additional data relationships may exist but are not graphically present in the graphical representations.

As used herein, a data relationship represents a connection between data elements. A data relationship may be a direct relationship that is specified through a unique identifier of an attribute value of each data element in the direct relationship. A relationship may be an indirect relationship between data elements that is specified by common attribute values that are common to the data elements. A relationship may be an inferred relationship between data elements by being derived from the attribute values of the data elements. In other words, while the attribute values may be different between the data elements, the attribute values may have a relationship (e.g., containment, dependency) that infers a relationship to the data element itself creating an inferred relationship. By way of an example of an inferred relationship, a data element representing a rock type (e.g., sandstone) and having an attribute of porosity is related to a data element representing a reservoir having an attribute of fluid flow based on the porosity affecting the fluid flow.

The combined graphical information may be used to form and/or modify an extraction plan. The extraction plan may include a listing of operations for extracting fluids or other resources from a wellsite, a field, and/or a geographic region. For example, the combined graphical information may illustrate new relationships that were not illustrated in the multiple graphical representations but was present in the auxiliary data. The extraction plan may be used to perform operations in a wellsite, field, and/or geographic region.

In particular, operations at the wellsite, field, and/or graphic regions may be performed in accordance with an extraction plan. The extraction plan may include one or more actions. The actions may be, for example, boring of a wellbore at a specified location, directional drilling of a wellbore, insertion of completion components in a wellbore, or any other type of wellsite operation. In other examples, the actions may be obtaining of materials for use in a wellsite, acquisition and transportation of equipment to a wellsite, and/or assignment of resources for use at the wellsite The extraction plan may be based on field data of at least one wellsite, field, and/or geographic region. For example, the field data may relate to a geological formation near a wellsite, wellsite operations that have been performed at the wellsite, or any other type of data related to the wellsite. In other examples, the field data may include data related to multiple geological formations near which one or more well sites are disposed.

The field data may include one or more geological features of a geological formation. The geological features may represent one or more physical features of the geological formation. The physical features of the geological formation may be, for example, one or more layers of sandstone, one or more layers of limestone, one or more layers of shale, one or more layers of sand layer, one or more layers of turbidite, and/or one or more fault lines.

The field data may include down hole conditions that have occurred at a wellsite disposed near a geological formation. The down hole conditions may be, for example, a collapsed casing, obstructions in the borehole, osmotic swelling, an under gage borehole, differential compaction, differential sticking, an unconsolidated formation, an error in a wellbore geometry, a wellbore clearing, stress induced caving of the borehole, fracture of a surrounding geological formation, geopressured formation, and/or a reactive formation.

The field data may include wellsite names, locations, and/or other data that specifies characteristics of the wellsite.

The field data may include other data without departing from embodiments of the technology.

The field data may be collected by any technique including, but not limited to, the use of downhole sensors, surveys, aggregation of completed and/or partially completed extraction plan data, and geological modeling. In other embodiments of the technology, the field data may be aggregated from multiple data repositories located on a variety data storage systems including, but not limited to, servers, cloud storage, client systems, and local computing systems.

In one or more embodiments, field data may be collected by performing a measurement of a geological feature as shown in FIG. 1. FIG. 1 depicts a schematic view, partially in cross section, of a field (100) in which one or more embodiments may be implemented. In one or more embodiments, the field may be an oilfield. In other embodiments, the field may be a different type of field. In one or more embodiments, one or more of the modules and elements shown in FIG. 1 may be omitted, repeated, and/or substituted. Accordingly, embodiments should not be considered limited to the specific arrangements of modules shown in FIG. 1.

As shown in FIG. 1, a geological feature (105) of a geological formation may be located below a surface (110) of the geological formation. As discussed above, the geological feature (105) may be for example, one or more layers of sandstone, one or more layers of limestone, one or more layers of shale, one or more layers of sand layer, one or more layers of turbidite, and/or one or more fault lines.

In one or more embodiments, various survey tools and/or data acquisition tools are adapted to measure the geological feature (105) and detect the characteristics of the geological feature (105) of the geological formation. In one or more embodiments, the survey tools and/or data acquisition tools may include a seismic data collector (115). The seismic data collector (115) may be a physical device that utilizes acoustic energy to interrogate the geological feature (105). The seismic data collector (115) may include an acoustic energy generator that generates acoustic waves and directs at least a portion of the generated waves towards the geological feature (105). The portion of the acoustic waves may be scattered by the geological feature (105) and at least a portion of the scattered waves may be received by a receiver of the seismic data collector (115). The seismic data collector (115) may record the received scattered waves and thereby generate a relationship between received acoustic energy versus time.

While the seismic data collector (115) has been described as having a single acoustic generator and single acoustic receiver, the seismic data collector (115) may include multiple generators and multiple receivers. In addition, the generators and receivers may be located at different spatial locations and thereby relationships between received acoustic energy versus time at various locations may be generated.

Other data collecting devices, sensors, systems, or surveying tools may be used without departing from the technology disclosed herein.

In one or more embodiments, the seismic data collector (115) may be connected by a data link (125) to a wellsite analyzer (120). As will be discussed in detail below, the wellsite analyzer (120) may generate an extraction plan based on field data. The data link (125) may enable the seismic data collector (115) to send seismic data of the geologic formation to the geologic analyzer (120). Other data collected by other devices and/or sensors may be sent to the wellsite analyzer (120) via the data link (125). In one or more embodiments, the data link (125) may be an operable connection. For example, the operable connection may be a wired or wireless data communications link. In one or more embodiments, the data link may be a physical transfer of the seismic data by way of physical transport of a non-transitory computer readable storage medium from the seismic data collector (115) to the geologic analyzer (120). The non-transitory computer readable storage medium, may be, for example, a universal serial bus flash memory stick, a memory card, or any other computer readable physical medium.

While FIG. 1 is illustrating as being on land, e.g., the seismic data collector (115) on surface (110), one or more embodiments are not limited to locations on land. One or more embodiments are located under a body of water. For example, the seismic data collector (115) shown in FIG. 1 may be mounted on an boat or other seafaring vehicle, may be mounted on a flotation device such as a buoy, and/or may be mounted to an aerial vehicle.

Figure 2:
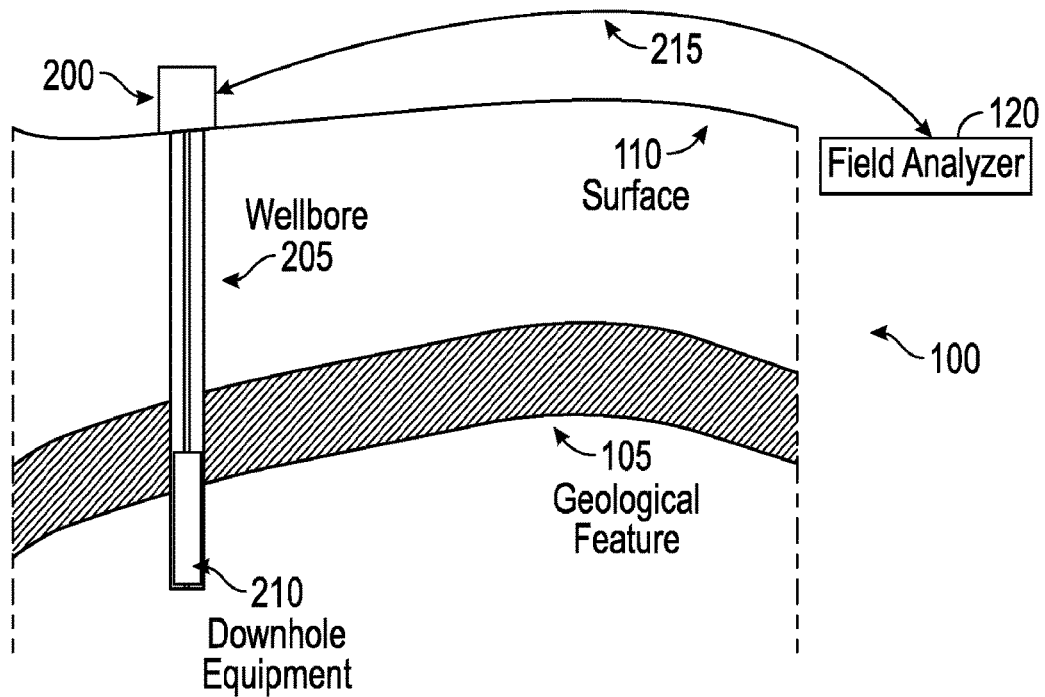
FIG. 2 shows a second schematic diagram of a wellsite in accordance with one or more embodiments.

In addition to the seismic data collector, one or more embodiments may include a wellsite (200) as shown in FIG. 2 the wellsite (200) may include and/or be associated with a rig (not shown), a wellbore (103), and downhole equipment that is configured to perform wellsite operations, such as logging, drilling, fracturing, production, and/or other applicable operations. The wellsite operations may be performed in accordance with an extraction plan.

In one or more embodiments, the wellsite may be connected to the wellsite analyzer (120) by a data link (215). The data link (215) may be the same data link (215) shown in FIG. 1 or a different data link. The data link (215) may enable the wellsite analyzer (120) to send the extraction plan to the wellsite (200) and/or modify an existing extraction plan at the wellsite (200). The data link (215) may enable the wellsite analyzer (120) to receive data from the wellsite (200). The data from the wellsite (200) may specify a condition present at the wellsite, an action performed at the wellsite in accordance with the extraction plan, equipment located at the wellsite, materials located at the wellsite, or any other information related to the wellsite and/or a formation near the wellsite. In one or more embodiments, the data link (215) may be an operable connection. For example, the operable connection may be a wired or wireless data communications link. In one or more embodiments, the data link may be a physical transfer of the extraction plan by way of physical transport of a non-transitory computer readable storage medium from the wellsite analyzer (120) to the wellsite (200). The non-transitory computer readable storage medium, may be, for example, a universal serial bus flash memory stick, a memory card, or any other computer readable physical medium.

In one or more embodiments, the wellsite may include a field management tool (not shown) that is configured to control actions performed at the wellsite. The field management tool may be operably connected to, for example, the downhole equipment (210) and thereby control or otherwise direct the action of the equipment. Thus, the field management tool may cause wellsite operations to be performed in accordance with the extraction plan received from the wellsite analyzer.

Figure 3:
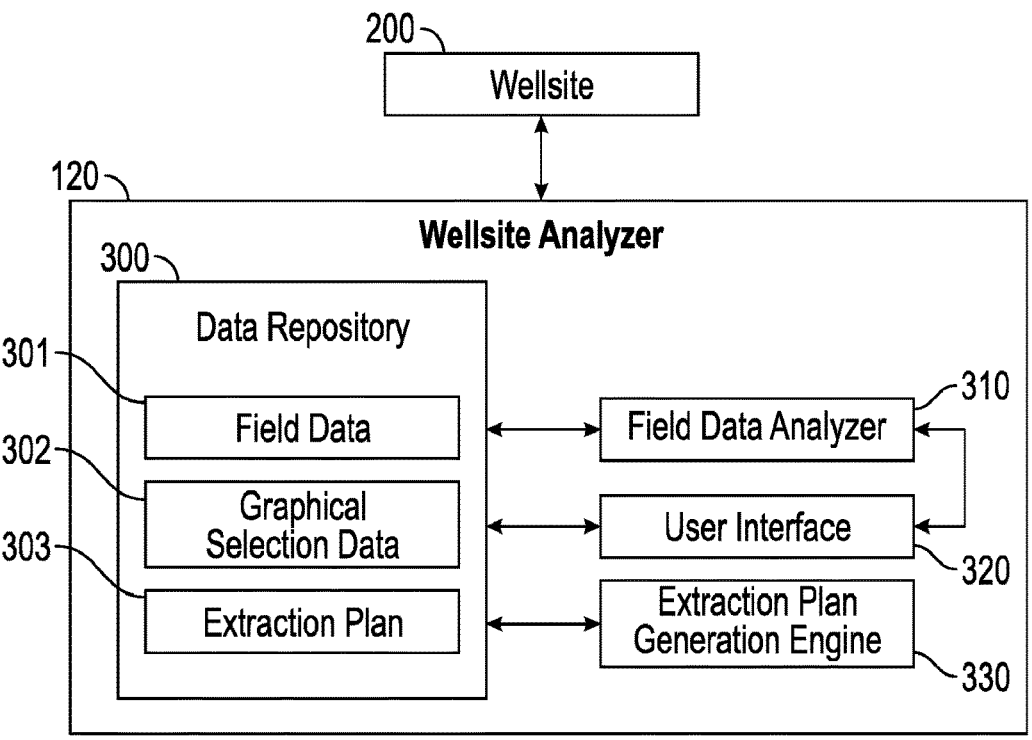
FIG. 3 shows a schematic diagram of a system in accordance with one or more embodiments.

FIG. 3 shows a schematic diagram of a system in accordance with one or more embodiments. In FIG. 3, lines represent operable connections between components. In other words, the operable connections represent at least some of the components that may share data and commands. The operable connections may be direct or indirect, through a network, through shared storage, through application programming interface (API) calls, intermittent or semi-permanent, or through any other type of connection. As shown in FIG. 3, the wellsite (200) is connected to the wellsite analyzer (120) and thereby the field management tool may receive an extraction plan generated by the wellsite analyzer (120). Similarly, the seismic data collector (115) is connected to the wellsite analyzer (120) and, thereby, the wellsite analyzer (120) may receive seismic data of the geologic formation.

As shown in FIG. 3, the geologic analyzer (120) includes a data repository (300), a field data analyzer (310), a user interface (320), an extraction plan generation engine (330), and a user interface (340). Each of these components is described below.

In one or more embodiments of the technology, the data repository (300) is any type of storage unit and/or device (e.g., a file system, database, collection of tables, or any other storage mechanism) for storing data. Further, the data repository (300) may include multiple different storage units and/or devices. The multiple different storage units and/or devices may or may not be of the same type or located at the same physical site.

The data repository (300) includes functionality to store field data (301), graphical selection data (302), and an extraction plan (303) in accordance with one or more embodiments of the technology. In one or more embodiments of the technology, the field data (301) may include measurements of geological formations as discussed above with reference to FIGS. 1 and 2. In one or more embodiments of the technology, the field data (301) may include downhole conditions that have occurred at a wellsite as discussed above with reference to FIGS. 1 and 2. In one or more embodiments of the technology, the field data (301) may include descriptions and/or quantitative data of wellsite operations that have been performed at wellsites as discussed above with reference to FIGS. 1 and 2. The field data (301) may include any data reflecting the current state of one or more wellsites that are each disposed near one or more geological formations. The field data (301) may further include information about a well at the wellsite, e.g., existing wellbores, completion components installed in the wellbore, etc.

The field data is further explained by way of an example. FIG. 6.1 show an example of field data (301) in accordance with embodiments of the technology. The field data (301) includes wellsite A data (601) through wellsite N data (602). Wellsite A data (601) may include data regarding the condition of a first wellsite.

Wellsite N data (602) may include data regarding the condition of a second wellsite.

Wellsite A data (601) includes a number of attributes (611, 612) as shown in FIG. 6.2. Each of the attributes may specify a relationship. For example, the relationship may be that each element of an attribute specifies a spatial location.

Attribute A (611) includes a number of elements (621, 622) as shown in FIG. 6.3. Each of the elements (621, 622) include at least one attribute value. Each of the elements may form a portion of the relationship specified by the attribute A (611). For example, an element may specify a data point and a number of elements, that have a common attribute, may specify a line. More complicated relationships be may present within the data without departing from the technology.

The field data may be organized in a different order without departing from the technology. For example, the field data may be organized by a type of action performed a wellsite, a condition found at the wellsite, or any other attribute without departing from the technology.

Graphical representations of the attributes (611, 612) may be generated based on the elements (611, 621) of one or more of the attributes. For example, a field data may include wellsite regarding a first wellsite and data regarding a second wellsite. The data regarding the first wellsite may include three attributes. The three attributes may be a name, a location, and fluid extraction over time relationship. The data regarding the second wellsite may also include three attributes. The three attributes may be a name, a location, and a diesel fuel used over time relationship. A first graphic representation of the data regarding the first wellsite may illustrate the fluid extraction over time relationship. Thus, the first graphic representation may illustrate a portion of the data included in the data regarding the first wellsite because the first graphic representation does not illustrate the name or location attributes. A second graphic representation of the data regarding the second wellsite may illustrate the diesel fuel used over time relationship. Thus, the second graphic representation may illustrate a portion of the data included in the data regarding the second wellsite because the second graphic representation does not illustrate the name or location attributes. The remaining data may be considered auxiliary data.

As will be discussed below, embodiments of the technology may enable new data relationships to be found. For example, with respect to the example described immediately above, embodiments of the technology may automatically determine that both of the data regarding the first wellsite and the data regarding the second wellsite include name and location. Thus, the attributes have a location attribute that are common to both data sets. The commonality of these attributes may be used to automatically determine relationships between each of the data sets. The determined relationships may be used to generate new graphical representations of the auxiliary data of the data sets.

Returning to FIG. 3, in one or more embodiments of the technology, the graphical selection data (302) is data that specifies types of graphical representations of the field data (301) that are generated. For example, the field data (301) may be multidimensional and graphical representations of the field data (301) may illustrate subsets of the field data (301). The graphical selection data (302) may specify the subset of the field data (301) that is included in a graphical representation of the field data (301).

In one or more embodiments, the graphical selection data (302) may specify selections on an individual user level. For example, multiple users may interact with the field data (301). Each of the users may be interested in viewing different subsets of the field data (301). The graphical selection data (302) may include profiles for each user that specify the subset of the field data (301) that is included in a graphic representation of the field data (301) for each user.

As will be discussed in greater detail, the graphical selection data (302) may be used by the user interface (320) when generating graphical representations of the field data (301).

In one or more embodiments of the technology, the extraction plan (303) is a set of wellsite actions. Each wellsite action may be any type of action that may be performed at the wellsite.

Continuing with FIG. 3, the field data analyzer (310) corresponds to hardware, software, firmware, or a combination thereof that includes functionality to generate graphical representations of the field data (301). In one or more embodiments, the field data analyzer (310) includes functionality to perform at least the method shown in FIG. 7. In one or more embodiments, the generated graphical representations of the field data (301) may be based on at least two graphical representations of the field data (301). The field data analyzer (310) may detect an overlap of the graphical representations and, in response to the overlap, generate a third graphical representation of the field data based on an attributes of the at least two graphical representations of the field data (301) and auxiliary data included in the field data.

Figure 4:
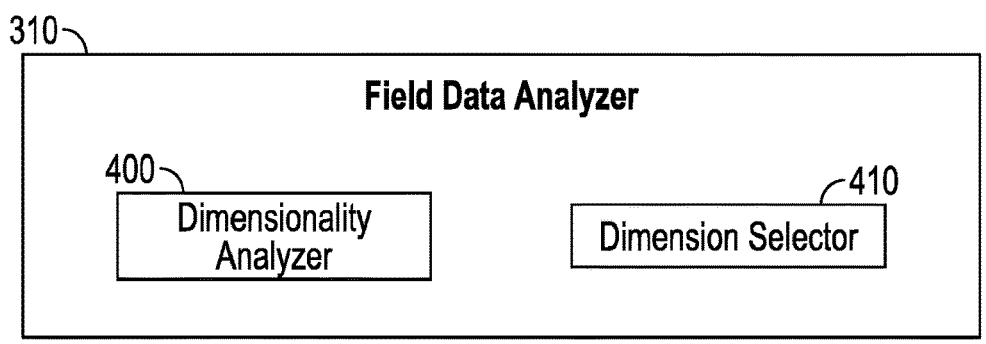
FIG. 4 shows a schematic diagram of a system in accordance with one or more embodiments.

To implement the functionality of the field data analyzer (310), the analyzer may include a dimensionality analyzer (400) and a dimension selector (410) as shown in FIG. 4 and in accordance with one or more embodiments.

In one or more embodiments, the dimensionality analyzer (400) is configured to determine attributes of a field data on which a graphical representation is based. A relationship may be, for example, a relation between an independent and a dependent variable. Multiple relationships may be included in the field data. As discussed above, a graphical representation of a field data may be based on a subset of the field data. The subset of the field data may include a portion of the relationships present in the field data.

The dimensionality analyzer (400) may determine attributes of the field data that is represented in the graphical representation. For example, the dimensionality analyzer (400) may determine a quantity that a first axis of a graphical representation represents, determine a second quality that a second axis of a graphical representation represents, and identify the attributes represented in the graphical representation based on the quantity and the second quantity. For example, a field data may include an attribute that specifies a downhole condition during a number of phases of boring a wellbore. In another example, a field data may include a second attribute that specifies a type of drill bit used during a number of phases of boring a wellbore. The field data may include any number of attributes that specify other types of relations without departing from the technology.

In one or more embodiments, the dimensionality analyzer (400) may be configured to retrieve a field data (301) stored in the data repository. The field data (301) may include additional attributes in addition to those determined based on the graphic representations, as discussed above. The dimensionality analyzer (400) may be configured to identify additional attributes specified in the field data (301) that are not illustrated in the graphical representation of the field data.

In one or more embodiments, the dimensionality analyzer (400) may be configured to analyze multiple graphical representations of field data, as discussed above. Each analyzation of a graphical representation may yield attributes of the field data included in the graphical representation of the field data and identify auxiliary data that includes additional attribute data that is not represented in the graphical representations of the field data. The dimensionality analyzer (400) may store the determined attributes of the field data in the data repository or in another location.

In one or more embodiments, the dimension selector (410) may be configured to select attributes generated by the dimensionality analyzer. In one or more embodiments, the dimension selector (410) may be configured to generate a graphical representation of field data based on the selected attributes.

In one or more embodiments, the dimension selector (410) may select attributes based on the graphical selection data (302). For example, the graphic selection data (302) may specify an attribute of the attributes.

In one or more embodiments, the dimension selector (410) may select attributes by querying a user via a graphical user interface generated by the user interface (320). For example, the dimension selector (410) may send a request to the user interface (320) to generate a graphical user interface. The graphical user interface may display the attribute data determined by the dimensionality analyzer (400). A user may select one or more attributes of the attributes via the graphical user interface. The dimension selector (410) may select the attributes based on the one or more attributes selected by the user.

Returning to FIG. 3, in one or more embodiments of the technology, the user interface (320) corresponds to hardware, software, firmware, or a combination thereof that includes functionality to generate user interfaces and/or other graphic displays. The user interfaces may be graphical user interfaces.

Figure 5:
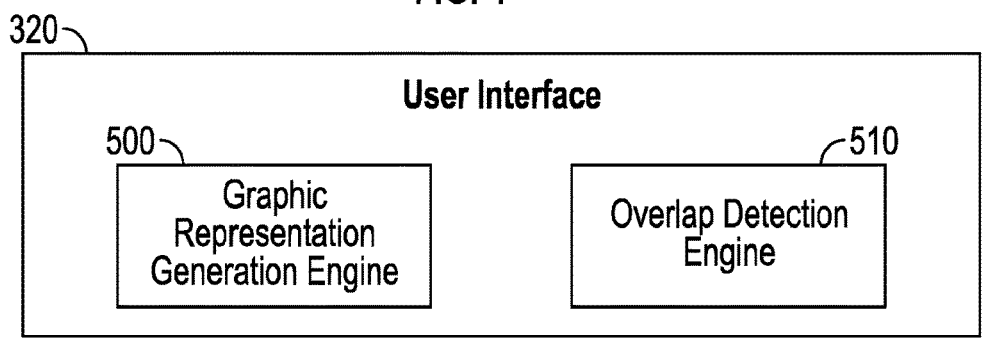
FIG. 5 shows a schematic diagram of a system in accordance with one or more embodiments.

To implement the functionality of the user interface (320), the user interface may include a graphic representation generation engine (500) and an overlap detection engine (510) as shown in FIG. 5 and in accordance with one or more embodiments.

In one or more embodiments, the graphic representation generation engine (500) is configured to generate interactive graphic interfaces and/or graphic displays. The interactive graphic interfaces may enable a user to interact with the wellsite analyzer. For example, the interactive graphic interface may display a graphic that includes one or more user interface widgets. The user interface widgets may be, for example, radio buttons, check boxes, input fields, or any other interactive element. The user interface widgets may be selected by a user and accept feedback. For example, a user may select a radio button by way of actuating a cursor location to the location of the radio button and clicking a button to activate the radio button.

The graphic display may enable the wellsite analyzer to display graphic representations of field data. For example, the graphic display may display a plot of a subset of the field data. The graphic display may be static, e.g., not interactive, or may be interactive, e.g., may include interaction points that accept feedback from a user.

Each interactive graphic interface or graphic display may be displayed in separate display windows. Other fields, structures, or other graphical elements may be used to display the graphic interface and/or graphic display without departing from the technology. As used herein, a graphical element is a portion of the graphical representation that is a visual representation of a data element.

In one or more embodiments, the graphic representation generation engine (500) may generate the interactive graphic interfaces and/or graphic displays by sending a command to an operating system of a device on which the wellsite analyzer is operating. In one or more embodiments, the graphic representation generation engine (500) may generate the interactive graphic interfaces and/or graphic displays by sending a command to an operating system of a device to which the wellsite analyzer is connected by way of an operable connection. The operating system may populate a frame buffer of a video card based on the command sent by the graphic representation generation engine (500) and thereby display the interactive graphic interfaces and/or graphic displays on a display that is operably connected to the video card. The operating system may generate images that are displayed on a display without departing from the technology.

In one or more embodiments, the overlap detection engine (510) is configured to detect when a window showing a first graphic representation overlaps a second window showing a second graphic representation. When an overlap is detected, the overlap detection engine (510) determines that an overlap condition is met and is configured to notify the field data analyzer (310) that the overlap condition is met.

Returning to FIG. 3, in one or more embodiments of the technology, the extraction plan generation engine (330) corresponds to hardware, software, firmware, or a combination thereof that includes functionality to generate and/or modify an extraction plan (303). The extraction plan generation engine (330) may modify the extraction plan (303) based on commands executed by a user through the user interface (330).

In one or more embodiments, the extraction plan generation engine (330) may send the extraction plan (303) to the wellsite (200) after the extraction plan (303) is modified. Any method of sending the extraction plan (303) to the wellsite (200) may be used without departing from the technology.

Figure 7:
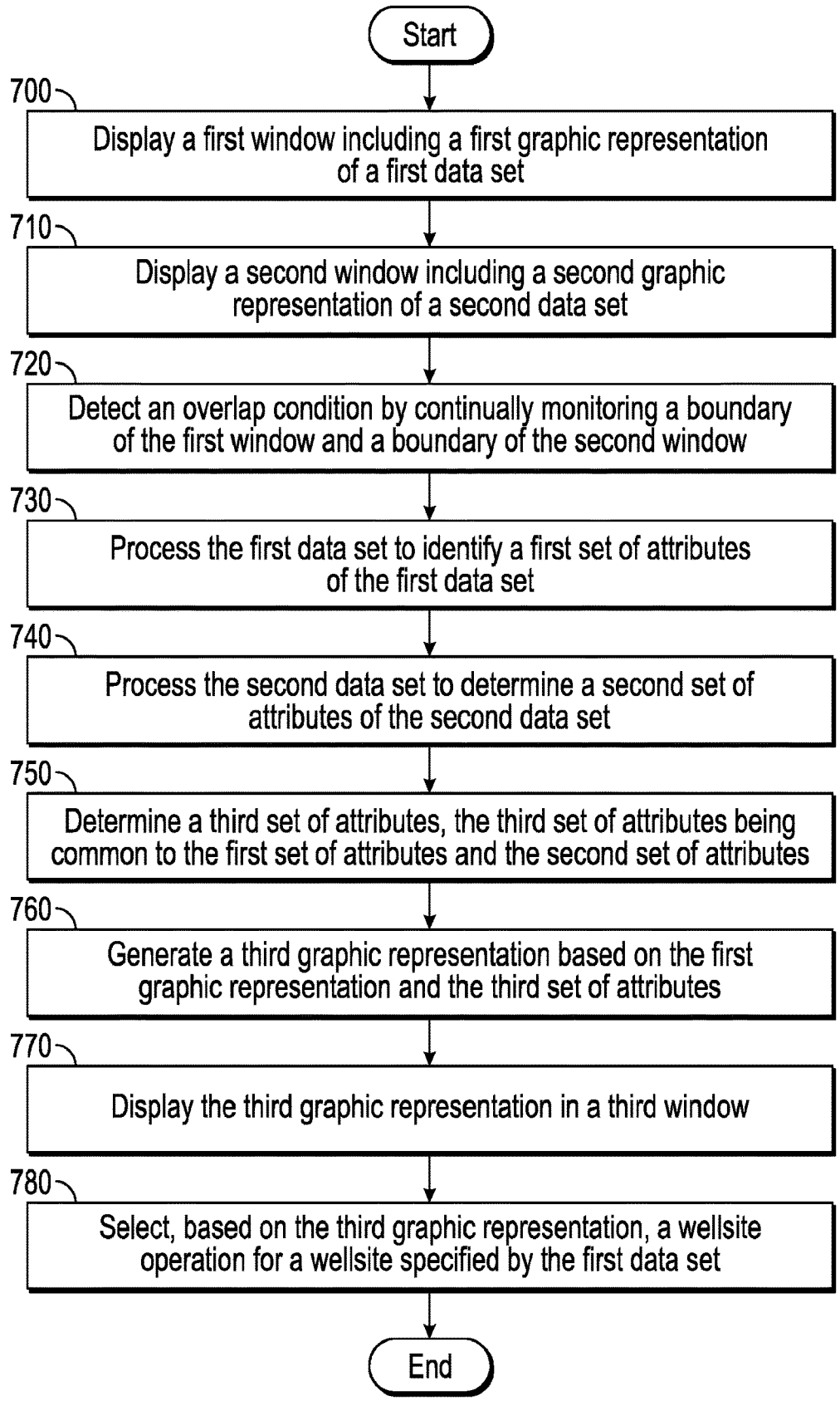
FIG. 7 shows a flowchart in accordance with one or more embodiments.

FIG. 7 shows a flowchart in accordance with one or more embodiments of the technology. The flowchart may illustrate a method. While the various blocks in this flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments of the technology. By way of an example, determination blocks may not use a processor to process an instruction unless an interrupt is received to signify that condition exists in accordance with one or more embodiments of the technology. As another example, determination blocks may be performed by performing a test, such as checking a data value to test whether the value is meets the tested condition in accordance with one or more embodiments of the technology.

In Block 700, a first window including a first graphic representation of a first data set is displayed. The first data set may be a subset of a field data. The first window may be displayed on a display such as a liquid crystal display. Other displays may be used without departing from the technology.

In one or more embodiments, the first graphic representation may be generated by a user interface of a wellsite analyzer. The first graphic representation may be a plot or other representation of the subset of the field data.

In Block 710, a second window including a second graphic representation of a second data set is displayed. The second data set may be a second subset of the field data. The second subset may include data that is different than data of the first subset of the field data.

In one or more embodiments, the second graphic representation may be generated by the user interface of the wellsite analyzer. The second graphic representation may be a plot or other representation of the second subset of the field data.

In one or more embodiments, the first data set and/or the second data set include auxiliary data. As discussed above, the auxiliary data may include data relationships that are not represented in either of the first graphic representation or the second graphic representation.

In Block 720, an overlap condition is detected by continually monitoring a boundary of the first window and a boundary of the second window. The overlap condition may be monitored by an overlap detection engine of the user interface.

In one or more embodiments, the first window and second window are displayed in a non-overlapping manner in block 700 and block 710. While displayed, a user may interact with the display to cause an overlap between the first window and the second window. For example, a user may draw and drop the second window on the first window and thereby cause an overlap.

In one or more embodiments, the overlap detection engine may detect an overlap condition by monitoring the boundary of the first window and a second boundary of the second window. The overlap detection engine may detect the overlap condition when the boundary of the first window and the second boundary of the second window intersect.

In one or more embodiments, the overlap detection engine may monitor the boundaries of the first window and the second window by monitoring a content of a frame buffer of a video card. The overlap detection engine may detect an intersection of the boundaries by identifying that an element of the frame buffer is initially written using information associated with the first window and then rewritten using information associated with the second window before a frame being buffered by the frame buffer is displayed on the display.

In one or more embodiments, the overlap detection engine may monitor the boundaries of the first window and the second window by monitoring a location, width, and height of a vector graphic that represents the first window and a location, width, and height of a second vector graphic that represents the second window. The overlap detection engine may detect intersection of the boundaries by calculating whether a portion of the vector graphic and a portion of the second vector graphic will occupy the same location in a video frame.

Other methods of detecting overlap between the first window and the second window may be used without departing from the technology.

In Block 730, the first data set is processed to identify a first set of attributes of the first data set.

In one or more embodiments, the first data set may be processed by analyzing a structure of the first data set. For example, as shown in FIGS. 6.1-6.3, each data set may be hierarchically organized and elements include attribute values that may be used to identify the attributes. The first set of attributes may be determined based on the attribute values included in the hierarchical organization. In one or more embodiments, the first set of attributes may be determined based on the auxiliary data included in the first data set.

In Block 740, the second data set is processed to determine a second set of attributes of the second data set.

In one or more embodiments, the second data set may be processed by analyzing a structure of the second data set. For example, as shown in FIG. 6.1-6.3, each data set may be hierarchically organized and include attribute values that identify the attributes. The second set of attributes may be determined based on the attribute values included in the hierarchical organization. In one or more embodiments, the second set of attributes may be determined based on the auxiliary data included in the second data set.

In Block 750, a third set of attributes are determined. The third set of attributes are common to the first set of attributes and the second set of attributes.

In one or more embodiments, the third set of attributes may be determined by comparing the attributes of the first data set to the attributes of the second data set determined in blocks 730 and 740, respectively.

In Block 760, a third graphic representation is generated based on the first graphic representation and the third set of attributes. Blocks 750 and 760 are described in greater detail in FIG. 8.

In Block 770, the third graphic representation is displayed in a third window.

In one or more embodiments, the third window may be displayed transmitting the third graphic representation to a client computing system operably connected to the computing system that generated the third graphic representation. The client computing system may be disposed at a different location than the computing system that generated the third graphic representation. The client computing system may generate the third window and display the third graphic representation in the third window.

In one or more embodiments, the third window may be displayed on a monitor operably connected to the computing system that generated the third graphic representation.

In one or more embodiments, the computing system may generate a video stream that shows a third window including the third graphic representation. The video stream may be broadcast to one or more recipient computing systems. The recipient computing system may display the video stream on a monitor operably connected to the recipient computing system.

In Block 780, a wellsite operation for a wellsite specified by the first data set is selected based on the third graphic representation.

In one or more embodiments, the user may view the displayed third graphic representation and select the wellsite operation based on the displayed third graphic representation.

The wellsite operation may be used to generate and/or modify an extraction plan. For example, the wellsite operation may be used by an extraction plan generation engine of a wellsite analyzer to generate and/or modify an extraction plan.

Figure 8:
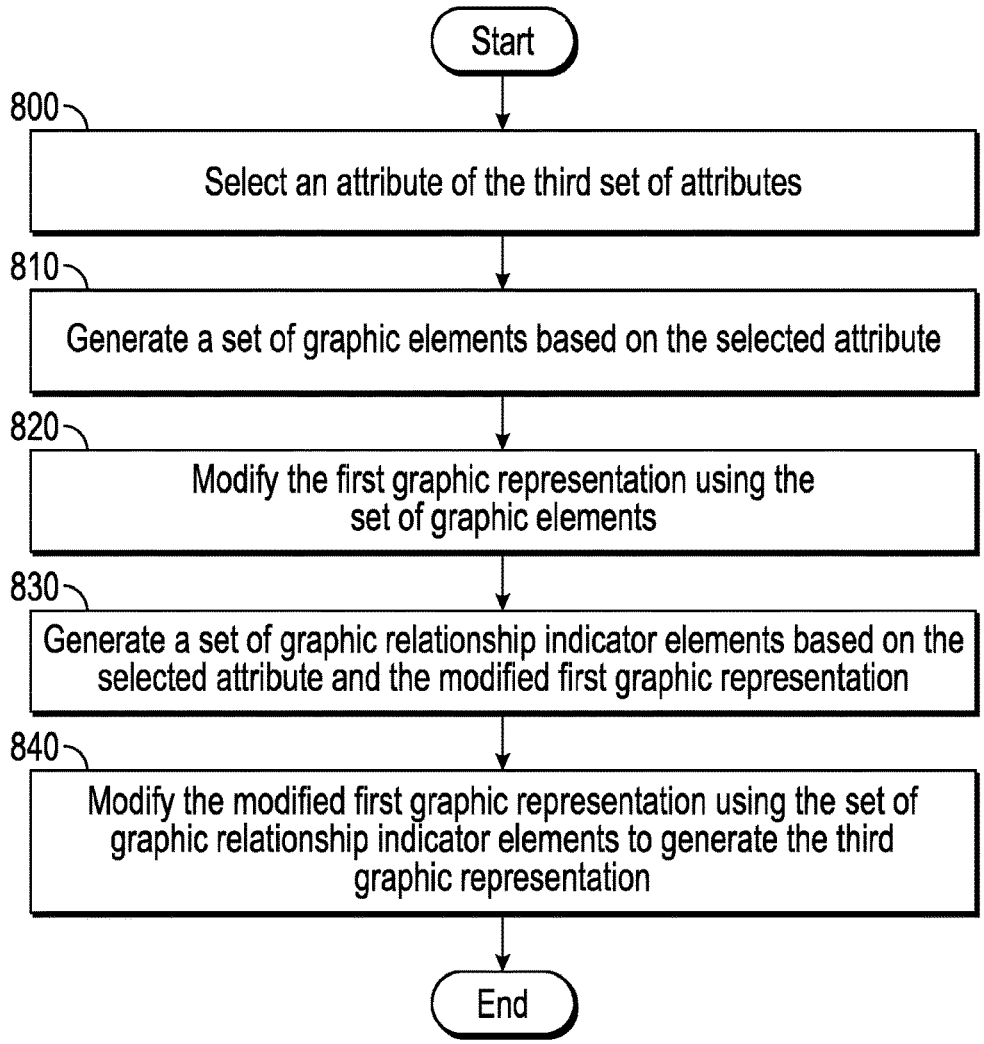
FIG. 8 shows a flowchart in accordance with one or more embodiments.

FIG. 8 shows a flowchart in accordance with one or more embodiments of the technology. The flowchart may illustrate a method. While the various blocks in this flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments of the technology. By way of an example, determination blocks may not use a processor to process an instruction unless an interrupt is received to signify that condition exists in accordance with one or more embodiments of the technology. As another example, determination blocks may be performed by performing a test, such as checking a data value to test whether the value meets the tested condition in accordance with one or more embodiments of the technology.

In Block 800, an attribute of the third set of attributes is selected.

In one or more embodiments, the attribute may be selected based on a graphical selection data. The graphical selection data may specify the attribute.

In one or more embodiments, the attribute may be selected via a user interface. The user interface may be a graphical user interface that specifies each of the attributes of the third set of attributes. The graphical user interface may enable a user to interactively select one of the attributes. For example, the user may select the attribute by using a gesture such as a point and click operation.

In Block 810, a set of graphic elements are generated based on the selected attribute. As used herein, the set of graphic elements are at least one graphic that visually specifies data and/or data relationships.

In one or more embodiments, the set of graphic elements may be icons that represent the attribute selected in block 800. For example, the icons may have a size, color, or shape that depends on a relationship represented by the attributes.

Another characteristic of the icons may be used to represent the relationship of the attribute without departing from the technology.

In one or more embodiments, the set of graphic elements are generated based on a relationship between the selected attribute of the third set of attributes and an attribute of the second data set that is not common to both the first data set and the second data set. More specifically, in Block 750 attributes that are common to the first set of attributes that are illustrated in the first graphic representation and to the second set of attributes that are illustrated in the second graphic representation are identified as the third set of attributes. The second set of attributes may include additional attributes that are not common to both sets of attributes, e.g., not graphically illustrated in both of the first graphic representation and the second graphic representation. The additional attributes may be related to the second set of attributes and, thereby, indirectly related to the first set of attributes. The graphic elements may be generated based on the direct and indirect relationship.

For example, a first graphic representation may illustrate a first attribute that specifies a relationship between names of wellsites and locations of wellsites. A second graphic representation may illustrate a first attribute that specifies a relationship between conditions at wellsites and location of the wellsites. A third set of attributes that are common to both the first graphic representation and the second graphic representation may be identified as the location of the wellsites. An attribute illustrated by the second graphic representation that is not common to both of the first graphic representation and the second graphic representation may be identified as the condition at the wellsites. The condition at the wellsites may be directly related to the location of the wellsites in the data set on which the second graphic representation is based. The condition at the wellsites may be indirectly related to the names of the wellsites based on a direct relationship and an indirect relationship. The names of the wellsites are directly related to the locations of the wellsite. The location of the wellsite is included in the data set on which the first graphic representation is based and the locations of the wellsites are directly related to the conditions of the wellsites in the data set on which the second graphic representation is based. An indirect relationship may be derived based on the two aforementioned direct relationships. Thus, based on the indirect relationship, a set of graphic elements that represents the indirect relationship between the names of the wellsites and the conditions at the wellsites may be generated.

In Block 820, the first graphic representation is modified using the set of graphic elements.

In one or more embodiments, the first graphic representation is modified by overlaying the set of graphic elements over the first graphic representation.

For example, by extending the example described with respect to Block 810, the set of graphic elements may include a number of icons. Each of the icons may represent a relationship between a name of a wellsite and a condition at the wellsite. The first graphic representation may specify a relationship between a names of a wellsite and a location of the wellsite. The set of graphic elements may be overlaid on the first graphic representation at locations of the first graphic representation specified by the relationship between the names of the wellsite and the locations of the wellsites. For example, the first graphic representation may include icons on a spatial map that indicate the presence of a wellsite at the location. The icons may also include text that indicates the wellsite name at each location. Icons of the set of graphic elements may be placed over each of the icons on the spatial map to modify the first graphic representation.

In Block 830, a set of graphic relationship indicator elements is generated based on the selected attribute and the modified first graphic representation.

In one or more embodiments, the graphic relationship indicator elements may be lines or other indicator elements. The graphic relationship indicator elements may specify a relationship between each graphic element of the set of graphic elements. For example, the graphic relationship indicator elements may specify an ordering, grouping, or other significance of the each graphic element of the set of graphic elements.

For example, by extending the example described with respect to Block 820, conditions at multiple wellsites may be similar and specified by the relationship described with respect to block 810. To illustrate the similarly of conditions, lines between icons of the set of graphic icons may be generated and placed over the first graphic element. The lines may graphically indicate a relationship that is of interest to a user.

In another example, the graphical relationship indicator elements may be contour lines that group icons of the set of graphic elements. The contour lines may indicate groups of the set of graphic elements that have a similar condition.

The set of graphic relationship indicator elements may be generated based on the spatial arrangement of the set of graphic elements superimposed on the first graphic representation.

Other graphic relationship indicator elements may be used without departing from the technology.

In Block 840, the modified first graphic representation is modified using the set of graphic relationship indicator elements to generate the third graphic representation.

In one or more embodiments, the modified first graphic representation may be modified by superimposing the graphic relationship indicator elements over the modified first graphic representation. A graphic relationship indicator element is a graphical element that visually represents a data relationship between at least two data elements. For example, the graphic relationship indicator elements may be arrows. The arrows may have tails of varying thickness that visually specify a magnitude of a data on which the arrows are based. A modified first graphic representation may include a number of icons spatially distributed over an area. The arrows may be superimposed over the modified first graphic representation to visually indicate a relationship on which the arrows are based. Each arrow may, for example, start at a first icon and end at a second icon. The arrow between the icons may visually indicate a relationship between the icons.

Figure 9:
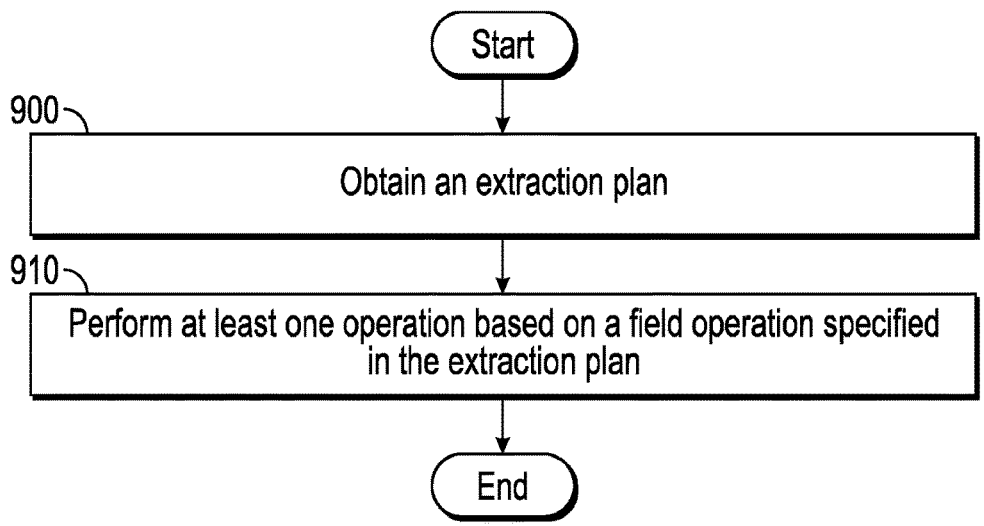
FIG. 9 shows a flowchart in accordance with one or more embodiments.

FIG. 9 shows a flowchart in accordance with one or more embodiments of the technology. The flowchart may illustrate a method. While the various blocks in this flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments of the technology. By way of an example, determination blocks may not use a processor to process an instruction unless an interrupt is received to signify that condition exists in accordance with one or more embodiments of the technology. As another example, determination blocks may be performed by performing a test, such as checking a data value to test whether the value meets the tested condition in accordance with one or more embodiments of the technology.

In Block 900, an extraction plan is obtained. In one or more embodiments, the extraction plan includes at least one wellsite operation. In one or more embodiments, the extraction plan is obtained by a wellsite. In one or more embodiments, the extraction plan is obtained by an operable connection. In one or more embodiments, the extraction plan is obtained by reading a computer readable non-transitory storage medium on which the extraction plan is stored.

In Block 910, a wellsite operation is performed based on the extraction plan. The wellsite operation may be, for example, boring of a wellbore at a specified location, installation of a completion component in an existing wellbore, or any other wellsite operation.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

One or more embodiments may be implemented on a computing system. Any combination of mobile, desktop, server, router, switch, embedded device, or other types of hardware may be used. For example, as shown in FIG. 10.1, the computing system (1000) may include one or more computer processors (1002), non-persistent storage (1004) (e.g., volatile memory, such as random access memory (RAM), cache memory), persistent storage (1006) (e.g., a hard disk, an optical drive such as a compact disk (CD) drive or digital versatile disk (DVD) drive, a flash memory, etc.), a communication interface (101) (e.g., Bluetooth interface, infrared interface, network interface, optical interface, etc.), and numerous other elements and functionalities.

The computer processor(s) (1002) may be an integrated circuit for processing instructions. For example, the computer processor(s) may be one or more cores or micro-cores of a processor. The computing system (1000) may also include one or more input devices (1010), such as a touchscreen, input board, mouse, microphone, touchpad, electronic pen, or any other type of input device.

The communication interface (1012) may include an integrated circuit for connecting the computing system (1000) to a network (not shown) (e.g., a local area network (LAN), a wide area network (WAN) such as the Internet, mobile network, or any other type of network) and/or to another device, such as another computing device.

Further, the computing system (1000) may include one or more output devices (1008), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing systems exist, and the aforementioned input and output device(s) may take other forms.

Software instructions in the form of computer readable program code to perform one or more embodiments and may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

The computing system (1000) in FIG. 10.1 may be connected to or be a part of a network. For example, as shown in FIG. 10.2, the network (1020) may include multiple nodes (e.g., node X (1022), node Y (1024)). Each node may correspond to a computing system, such as the computing system shown in FIG. 10.1, or a group of nodes combined may correspond to the computing system shown in FIG. 10.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1000) may be located at a remote location and connected to the other elements over a network.

Although not shown in FIG. 10.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1022), node Y (1024)) in the network (1020) may be configured to provide services for a client device (1026). For example, the nodes may be part of a cloud computing system. The nodes may include functionality to receive requests from the client device (1026) and transmit responses to the client device (1026). The client device (1026) may be a computing system, such as the computing system shown in FIG. 10.1. Further, the client device (1026) may include and/or perform a portion of one or more embodiments.

The computing system or group of computing systems described in FIGS. 10.1 and 10.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, an input board, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system in FIG. 10.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 10.1, while performing one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B uses comparing the first element of vector A with the first element of vector B, the second element of vector A with the second element of vector B, etc. In one or more embodiments, if A and B are strings, the binary values of the strings may be compared.

The computing system in FIG. 10.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 10.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present a few examples of functions performed by the computing system of FIG. 10.1 and the nodes and/or client device in FIG. 10.2. Other functions may be performed using one or more embodiments.

The following are examples of systems and/or methods in accordance with one or more embodiments of the technology. The following examples are explanatory examples and not intended to the limit the technology.

FIG. 11 shows a user interface (1100) in accordance with embodiments of the technology. The user interface (1100) is displayed on a display (1101). The user interface includes a first graphic representation (1102) displayed in a first window and a second graphic representation (1103) displayed in a second window.

The first graphic representation (1102) include a number of icons (1104) that are each a graphic representation of a data element. The first graphic representation (1102) illustrates a spatial relationship between a number of wellsites. The second graphic representation (1103) illustrates a correlation between wellsite conditions at a number of wellsites.

The first graphic representation (1102) and the second graphic representation (1103) were generated based on a field data (1105) shown in FIG. 11.2. The field data (1105) shown in FIG. 11.2 includes wellsite A data (1106) and wellsite B data (1113).

The wellsite A data (1106) includes a first attribute, e.g., wellsite location data (1107), and a second attribute, e.g., fault line data (1110). The wellsite location data A (1107) specifies the location and name of a number of wellsites (1108, 1109). The fault line data specifies a location and depth of a number of fault lines (1111, 1112).

The wellsite B data (1113) includes a third attribute, e.g., well operation data (1114), that specifies the name of a wellsite, the condition identified at the wellsite, and the date the condition was identified for a number of operations (1115, 1116).

Returning to FIG. 11.1, the first graphic representation (1102) graphically illustrates the attributes of the wellsite A data (1106). In contrast, the second graphic representation (1103) represents a subset of the attributes of the wellsite B data (1113). The name of the wellsite is not illustrated in the second graphic representation nor is the date the condition was identified at the wellsite illustrated in the second graphic representation (1102).

In FIG. 11.3, a user interacts with the second graphic representation (1103) via the user interface (1100). The interaction causes the second graphic representation (1103) to change location so that the second graphic representation (1103) overlaps the first graphic representation (1102). For example, the user may drag and drop the second graphic representation (1103) onto the first graphic representation (1102).

In response to the overlap, a selection window in the form of a GUI is generated and displayed. FIG. 11.4 shows an example of a selection window (1119) in accordance with embodiments of the technology.

The selection window displays two fields. The first field, recommended attribute (1120), specifies attributes of the field data (1105) that are recommended based on graphic selection data. The second field, other attributes (1122), specifies attributes of the field data (1105) that are not recommended based on the graphic selection data. Each of the fields includes interaction points (1121) that enable the user to select one of the attributes.

In this example, the user selects the recommended attribute (1120) labeled as condition.

In response to the selection, a third graphic representation (1130) is generated as discussed with respect to FIGS. 7 and 8. The third graphic representation (1130) is displayed in a window as shown in FIG. 11.5.

As seen from the third graphic representation (1130), a number of icons have been added having different colors that represent the relationship specified by the condition attribute. Wellsites having similar conditions are represented as icons having similar colors. Additionally, graphic relationship indicators in the form of lines have been added that illustrate relationship data between each of the wellsite based on the condition attribute.

Although the preceding description has been described herein with reference to particular means, materials, and embodiments, it is not intended to be limited to the particular disclosed herein. By way of further example, embodiments may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, embodiments extend to all functionally equivalent structures, methods, uses, program products, and compositions as are within the scope of the appended claims.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited by the attached claims.

What is claimed is:

1. A computer implemented method for dynamically combining graphical information from multiple windows displayed in a graphical user interface, the method comprising:
    displaying a first window comprising a first graphic representation of a first data set;
    displaying a second window comprising a second graphic representation of a second data set;
    detecting an overlap condition by constantly monitoring a boundary of the first window and a boundary of the second window;
    in response to detecting the overlap condition:
        processing the first data set to identify a first set of attributes of the first data set,
        processing the second data set to determine a second set of attributes of the second data set,
        determining a third set of attributes, the third set of attributes being common to the first set of attributes and the second set of attributes, wherein the second set of attributes includes at least one additional attribute that is not common to the first set of attributes and the third set of attributes,
        generating a third window comprising a third graphic representation based on the first graphic representation, the at least one additional attribute, and the third set of attributes, and
        displaying the third window, and
    selecting, based on the third graphic representation, a wellsite operation for a wellsite.

2. The computer implemented method of claim 1, further comprising:
    generating an extraction plan using the wellsite operation; and
    performing an operation based on the extraction plan.

3. The computer implemented method of claim 1, wherein processing the first data set comprises:
    obtaining the first data set;
    identifying an attribute of the first data set represented by the first graphic representation; and
    identifying a plurality of elements of the first data set having the attribute of the first data set;
    wherein a first portion of the plurality of elements having the attribute are represented by the first graphic representation,
    wherein a second portion of the plurality of elements having the attribute are not represented by the first graphic representation.

4. The computer implemented method of claim 3, wherein processing the second data set comprises:
    obtaining the second data set;
    identifying an attribute of the second data set represented by the second graphic representation; and
    identifying a plurality of elements of the second data set having the attribute of the second data set;
    wherein a first portion of the plurality of elements having the attribute of the second data set are represented by the second graphic representation,
    wherein a second portion of the plurality of elements having the attribute of the second data set are not represented by the second graphic representation.

5. The computer implemented method of claim 4, wherein determining the third set of attributes comprises:
    matching the second portion of the plurality of elements having the attribute of the second data set to the first portion of the plurality of elements having the attribute of the first data set; and
    generating the third set of attributes based on the matching.

6. The computer implemented method of claim 5, wherein generating the third window comprising the third graphic representation comprises:
    selecting an attribute of the third set of attributes;
    generating a set of graphic elements based on the selected attribute;
    modifying the first graphic representation using the set of graphic elements;
    generating a set of graphic relationship indicator elements based on the selected attribute and the modified first graphic representation;
    generating the third graphic representation by modifying the modified first graphic representation using the set of graphic relationship indicator elements; and
    displaying the third graphic representation in the third window.

7. A system for extracting fluids, comprising: a data repository for storing: field data comprising: a first data set associated with a first field, and a second data set associated with a second field; an extraction plan associated with the first field; and a computer processor, operatively connected to the data repository, for executing: a user interface that: displays a first window comprising a first graphic representation of a first data set, displays a second window comprising a second graphic representation of a second data set, generates a third window comprising a third graphic representation based on the first graphic representation, at least one additional attribute, and a third set of attributes, and displays the third window:
  a field data analyzer that:
    detects an overlap condition by constantly monitoring a boundary of the first window and a boundary of the second window; and in response to detecting the overlap condition: processes the first data set to identify a first set of attributes of the first data set, processes the second data set to determine a second set of attributes of the second data set, generates the third set of attributes based on attributes that are common to the first set of attributes and the second set of attributes, wherein the second set of attributes includes the at least one additional attribute that is not common to the first set of attributes and the third set of attributes, and
  an extraction plan generation engine that:
    selects, based on the third graphic representation, a wellsite operation for a wellsite.

8. The system of claim 7, wherein the computer processor executes an extraction plan generation engine that:
  generates an extraction plan using the wellsite operation; and
  sends the extraction plan to a field to perform the wellsite operation based on the extraction plan.

9. The system of claim 7, wherein the first data set comprises:
  a first plurality of elements; and
  a second plurality of elements,
  wherein the second plurality of elements are not represented in the first graphic representation.

10. The system of claim 7, wherein the third set of attributes comprises:
  a first plurality of elements that are common to the first set of attributes and the second set of attributes; and
  a second plurality of elements that are not specified by the first data set,
  wherein an element having an attribute of the third set of attributes specifies a relationship between an element of the first plurality of elements and an element of the second plurality of elements.

11. The system of claim 10, wherein the relationship is one selected from a group consisting of an association, a grouping, and a ranking.

12. The system of claim 7, wherein the first data set specifies a name of the first wellsite, a location of the first wellsite, and an operation performed at the first wellsite.

13. The system of claim 12, wherein the second data set specifies a name of the second wellsite and an operation performed at the second wellsite.

14. The system of claim 13, wherein the third set of attributes specifies that the operation performed at the first wellsite and the operation performed at the second wellsite are the same operation.

15. The system of claim 14, wherein generating the third window comprising the third graphic representation comprises:
  identifying at least one attribute of the third set of attributes;
  generating a set of graphic elements based on the at least one attribute;
  modifying the first graphic representation using the set of graphic elements;
  generating a set of graphic relationship indicator elements based on the at least one attribute and the modified first graphic representation;
  generating the third graphic representation by modifying the modified first graphic representation using the set of graphic relationship indicator elements; and
  displaying the third graphic representation in the third window.

16. The system of claim 15, wherein the set of graphic elements comprises indicator graphics that specify an association between each graphic element of the set of graphic elements.

17. The system of claim 15, wherein the set of graphic relationship indicator elements comprises a plurality of line segments that represent a relationship between each graphic element of the set of graphic elements.

18. A non-transitory computer readable medium for field operations, the non-transitory computer readable medium comprising computer readable program code for:
  displaying a first window comprising a first graphic representation of a first data set;
  displaying a second window comprising a second graphic representation of a second data set;
  detecting an overlap condition by constantly monitoring a boundary of the first window and a boundary of the second window; and
  in response to detecting the overlap condition:
    processing the first data set to identify a first set of attributes of the first data set,
    processing the second data set to determine a second set of attributes of the second data set,
    determining a third set of attributes that are common to the first set of attributes and the second set of attributes, wherein the second set of attributes includes at least one additional attribute that is not common to the first set of attributes and the third set of attributes,
    generating a third window comprising a third graphic representation based on the first graphic representation, the at least one additional attribute, and the third set of attributes, and
    displaying the third window, and
  selecting, based on the third graphic representation, a wellsite operation for a wellsite.

19. The non-transitory computer readable medium of claim 18, further comprising computer readable program code for:
  generating an extraction plan using the wellsite operation; and
  performing an operation based on the extraction plan.

20. The non-transitory computer readable medium of claim 18, wherein the computer readable program code specify that processing the first data set comprises:
  obtaining the first data set;
  identifying an attribute of the first data set represented by the first graphic representation; and
  identifying a plurality of elements having the identified attribute;
  wherein a first portion of the plurality of elements having the identified attribute are represented by the first graphic representation,
  wherein a second portion of the plurality of elements having the identified attribute are not represented by the first graphic representation.

* * * * *